United States Patent [19]
Ottesen et al.

[11] Patent Number: 6,067,203
[45] Date of Patent: *May 23, 2000

[54] DISK DRIVE HAVING OPTIMIZED SPINDLE SPEED FOR ENVIRONMENT

[75] Inventors: Hal Hjalmar Ottesen; Gordon J. Smith, both of Rochester, Minn.

[73] Assignee: International Business Machines Corporation, Armonk, N.Y.

[ * ] Notice: This patent is subject to a terminal disclaimer.

[21] Appl. No.: 09/059,549

[22] Filed: Apr. 13, 1998

Related U.S. Application Data

[63] Continuation of application No. 08/625,201, Apr. 1, 1996, Pat. No. 5,764,430.

[51] Int. Cl.[7] .................................................. G11B 15/46
[52] U.S. Cl. .................................. 360/73.03; 360/97.02; 360/69; 360/71; 360/75
[58] Field of Search .................................. 369/19, 20, 21, 369/69; 360/73.01, 73.03, 97.02, 97.03, 69, 71, 48, 75

[56] References Cited

U.S. PATENT DOCUMENTS

| | | |
|---|---|---|
| 4,685,303 | 8/1987 | Branc et al. . |
| 4,750,059 | 6/1988 | Syracuse . |
| 4,864,428 | 9/1989 | Kanamaru . |
| 5,210,660 | 5/1993 | Hetzler . |
| 5,227,929 | 7/1993 | Comerford . |
| 5,235,473 | 8/1993 | Sato et al. . |
| 5,285,327 | 2/1994 | Hetzler . |
| 5,412,519 | 5/1995 | Buettner et al. . |
| 5,440,474 | 8/1995 | Hetzler . |
| 5,566,077 | 10/1996 | Kulakowski et al. . |
| 5,589,996 | 12/1996 | Patrick et al. . |
| 5,623,597 | 4/1997 | Kikinis . |
| 5,764,430 | 6/1998 | Ottesen et al. ...................... 360/73.03 |

FOREIGN PATENT DOCUMENTS

| | | |
|---|---|---|
| 60-171672 | 2/1984 | Japan . |
| 63-273287 | 10/1988 | Japan . |

OTHER PUBLICATIONS

JP 4092254 A, published Mar. 25, 1992, Hard Disk Memory Device.

JP5342585, published Dec. 24, 1993, Information Reproducing Device.

*Primary Examiner*—Alan Faber
*Attorney, Agent, or Firm*—William D. Miller; Tyler L. Nasiedlak; Mark Hollingsworth

[57] ABSTRACT

A disk storage device in which two or more discrete disk velocities are used is disclosed. The disk velocity is selected using operating environmental conditions. Various types of sensors may be used to detect the environmental conditions or the environmental conditions may be input by a user. The allocation of track locations on a disk into zones reduces the number of zone bit frequencies the storage device must handle when multiple frequency zones are used in connection with the various spindle speeds.

24 Claims, 10 Drawing Sheets

| RPM | 3600 | 3339 | 3097 | 2873 | 2665 | 2472 | 2293 | 2127 | 1972 | 1830 |
|---|---|---|---|---|---|---|---|---|---|---|
| FH | 1.0000 | 0.9755 | 0.9516 | 0.9282 | 0.9055 | 0.8833 | 0.8616 | 0.8405 | 0.8199 | 0.7998 |
| Zone | Radii (mm) | | | | | | | | | |
| 1 | 27.55 | 6.8998 | | | | | | | | |
| 2 | 25.55 | 6.3999 | 6.3999 | | | | | | | | 
| 3 | 23.70 | 5.9363 | 5.9363 | 5.9363 | | | | | | |
| 4 | 21.98 | 5.5062 | 5.5062 | 5.5062 | 5.5062 | | | | | |
| 5 | 20.39 | 5.1072 | 5.1072 | 5.1072 | 5.1072 | 5.1072 | | | | |
| 6 | 18.91 | 4.7372 | 4.7372 | 4.7372 | 4.7372 | 4.7372 | 4.7372 | | | |
| 7 | 17.54 | 4.3940 | 4.3940 | 4.3940 | 4.3940 | 4.3940 | 4.3940 | 4.3940 | | |
| 8 | 16.27 | 4.0757 | 4.0757 | 4.0757 | 4.0757 | 4.0757 | 4.0757 | 4.0757 | 4.0757 | | |
| 9 | 15.09 | 3.7804 | 3.7804 | 3.7804 | 3.7804 | 3.7804 | 3.7804 | 3.7804 | 3.7804 | 3.7804 | |
| 10 | 14.00 | 3.5065 | 3.5065 | 3.5065 | 3.5065 | 3.5065 | 3.5065 | 3.5065 | 3.5065 | 3.5065 | 3.5065 |

| RPM | | 3600 | 3339 | 3097 | 2873 | 2665 | 2472 | 2293 | 2127 | 1972 | 1830 |
|---|---|---|---|---|---|---|---|---|---|---|---|
| FH | | 1.0000 | 0.9755 | 0.9516 | 0.9282 | 0.9055 | 0.8833 | 0.8616 | 0.8405 | 0.8199 | 0.7998 |
| Zone | Radii (mm) | | | | | | | | | | |
| 1 | 27.55 | 6.8998 | | | | | | | | | |
| 2 | 25.55 | 6.3999 | 5.9363 | | | | | | | | |
| 3 | 23.70 | 5.9363 | 5.5062 | 5.1072 | | | | | | | |
| 4 | 21.98 | 5.5062 | 5.1072 | 4.7372 | 4.3940 | | | | | | |
| 5 | 20.39 | 5.1072 | 4.7372 | 4.3940 | 4.0757 | 3.7804 | | | | | |
| 6 | 18.91 | 4.7372 | 4.3940 | 4.0757 | 3.7804 | 3.5065 | 3.2524 | | | | |
| 7 | 17.54 | 4.3940 | 4.0757 | 3.7804 | 3.5065 | 3.2524 | 3.0168 | 2.7982 | | | |
| 8 | 16.27 | 4.0757 | 3.7804 | 3.5065 | 3.2524 | 3.0168 | 2.7982 | 2.5955 | 2.4075 | | |
| 9 | 15.09 | 3.7804 | 3.5065 | 3.2524 | 3.0168 | 2.7982 | 2.5955 | 2.4075 | 2.2330 | 2.0713 | |
| 10 | 14.00 | 3.5065 | 3.2524 | 3.0168 | 2.7982 | 2.5955 | 2.4075 | 2.2330 | 2.0713 | 1.9212 | 1.7820 |

GEOMETRIC PROGRESSION

FIG. 8A

| RPM | 3600 | 3399 | 3198 | 2997 | 2796 | 2595 | 2395 | 2194 | 1993 | 1792 |
|---|---|---|---|---|---|---|---|---|---|---|
| FH | 1.0000 | 0.9812 | 0.9617 | 0.9413 | 0.9200 | 0.8976 | 0.8741 | 0.8492 | 0.8227 | 0.7943 |
| Radii (mm) | | | | | | | | | | |
| 28.13 | 7.0455 | 6.6523 | 6.2591 | 5.8659 | 5.4726 | 5.0794 | 4.6862 | 4.2929 | 3.8997 | 3.5065 |
| 26.56 | 6.6523 | 6.2810 | 5.9098 | 5.5385 | 5.1672 | 4.7959 | 4.4246 | 4.0533 | 3.6821 | 3.3108 |
| 24.99 | 6.2591 | 5.9098 | 5.5604 | 5.2111 | 4.8618 | 4.5124 | 4.1631 | 3.8137 | 3.4644 | 3.1151 |
| 23.42 | 5.8659 | 5.5385 | 5.2111 | 4.8837 | 4.5563 | 4.2289 | 3.9015 | 3.5741 | 3.2468 | 2.9194 |
| 21.85 | 5.4726 | 5.1672 | 4.8618 | 4.5563 | 4.2509 | 3.9454 | 3.6400 | 3.3346 | 3.0291 | 2.7237 |
| 20.28 | 5.0794 | 4.7959 | 4.5124 | 4.2289 | 3.9454 | 3.6619 | 3.3784 | 3.0950 | 2.8115 | 2.5280 |
| 18.71 | 4.6862 | 4.4246 | 4.1631 | 3.9015 | 3.6400 | 3.3784 | 3.1169 | 2.8554 | 2.5938 | 2.3323 |
| 17.14 | 4.2929 | 4.0533 | 3.8137 | 3.5741 | 3.3346 | 3.0950 | 2.8554 | 2.6158 | 2.3762 | 2.1366 |
| 15.57 | 3.8997 | 3.6821 | 3.4644 | 3.2468 | 3.0291 | 2.8115 | 2.5938 | 2.3762 | 2.1585 | 1.9408 |
| 14.00 | 3.5065 | 3.3108 | 3.1151 | 2.9194 | 2.7237 | 2.5280 | 2.3323 | 2.1366 | 1.9408 | 1.7451 |

ARITHMETIC PROGRESSION

FIG. 8B

DISK DRIVE HAVING OPTIMIZED SPINDLE SPEED FOR ENVIRONMENT

This application is a continuation of application Ser. No. 08/625,201, now U.S. Pat. No. 5,764,430 filed Apr. 1, 1996, which application are incorporated herein by reference.

BACKGROUND OF THE INVENTION

The present invention is directed to a method and apparatus for optimizing a rotating velocity of a magnetic medium, and in particular to a method and apparatus for controlling the rotating velocity in response to environmental conditions.

One of the key components of some electrical devices is a place to store and read data. For example, compact disk players read data, such as music, from a plastic disk. Another example is a VCR which reads data from a tape. Computer systems also store and read large amounts of data. Typically computer systems employ a number of storage means to store data. One of the places where a computer can store data is in a disk drive which is also called a direct access storage device.

Although this invention is not limited to a direct access storage device one will be described by way of example. A disk drive or direct access storage device includes several disks which look similar to records used on a record player or compact disks which are used in a CD player. The disks are stacked on a spindle, much like several records awaiting to be played. In a disk drive, however, the disks are mounted to the spindle and spaced apart so that the separate disks do not touch each other.

The surface of each disk is uniform in appearance. However, in actuality, each of the surfaces is divided into portions where data is stored. There are a number of tracks situated in concentric circles like rings on a tree. Each track in a disk drive is further subdivided into a number of sectors which is essentially just one section of the circumferential track.

Storage of data on a magnetic disk entails magnetizing portions of the disk in a pattern which represents the data. To store data on a disk the disk is magnetized. In order to magnetize the magnetic layer, a small ceramic block which contains a magnetic transducer known as a write element is passed over the surface of the disk. More specifically, the write element is flown at a height of approximately six millionths of an inch from the surface of the disk and is flown over the track as the write element is energized to various states causing the track below to be magnetized to represent the data to be stored. In some applications, the write element is the same as the read element. Other applications use a separate write element and a separate read element.

To retrieve data stored on a magnetic disk, a read element located in close proximity to the write element is flown over the disk. The magnetized portions of the disk provide a signal from the read element. By looking at output from the read element, the data can be reconstructed and then used by the computer system.

Like a record, both sides of a disk are generally used to store data or other information necessary for the operation of the disk drive. Since the disks are held in a stack and are spaced apart from one another, both the top and the bottom surface of each disk in the stack of disks has its own read element and write element. This would be comparable to having a stereo that could play both sides of a record at once. Each side would have a stylus which played the particular side of the record.

Disk drives also have something that compares to the tone arm of a stereo record player. There are two types of disk drives, rotary and linear. Rotary disk drives have a tone arm that rotates much like a record player. The tone arm of a rotary disk drive, termed an actuator arm, holds all the transducers or read/write elements, one head for each surface of each disk supported in a structure that looks like a comb. Sometimes the structure is called an E-block. Like a tone arm, the actuator arms rotate so that the read element and write element attached to the actuator arm can be moved to locations over various tracks on the disk. In this way, the write element can be used to magnetize the surface of the disk in a pattern representing the data at one of several track locations. The read element is used to detect the magnetized pattern on one of the tracks of a disk. For example, the needed data may be stored on two different tracks on one particular disk, so to read the magnetic representations of data, the actuator arm is rotated from one track to another track.

It should be noted that this invention is not limited to use in disk drives using magnetic media but is useful in any device having rotating media. In this particular application, where magnetic media is described as an example it should be recognized that the invention would be useful in other storage devices which have different types of media or read and write elements.

The use of direct access storage devices (DASD) in portable systems has increased significantly over the past several years. For example, magnetic hard disk drives are commonly incorporated into portable computers. The portable nature of the computer subjects the storage device to a variety of different operating environments and conditions. For example, the portable computer may be used in an airplane, thereby subjecting the storage device to substantial variations in atmospheric pressure, turbulent vibrations and the like.

The various operating environments and conditions in which a storage device is used can have significant adverse effects on the operation of the storage device. For example, a conventional magnetic disk drive which employs a rotating disk may be used in a portable computer. The disk drive uses a transducer, formed as part of a magnetic head assembly, to read information from and write information to the disk. The magnetic head assembly typically includes a slider having aerodynamic properties sufficient to allow the head assembly to fly in close proximity over the surface of the disk forming an air bearing between the transducer and the disk surface. A flexure arm couples the transducer/slider arrangement to an actuator arm. The flexure arm is spring loaded and opposes the aerodynamic lift of the slider to control a flying height over the surface of the disk. In a typical disk drive, the air bearing forms a head to disk spacing on the order or 50 nanometers (nm). When a conventional disk drive is incorporated into a portable computer used on an airplane, the lower cabin pressure reduces the lift capacity of the slider thereby reducing the air bearing between the head and disk. As the flying height is reduced, the likelihood of a head to disk crash increases.

A head to disk crash is a catastrophical event for a disk drive. It renders the disk drive useless, since access to data is no longer possible. This data loss can have severe economic implications for the user. It is therefore, of critical importance to minimize the likelihood of a head to disk crash.

Other environmental conditions can also adversely effect the operation of a storage device using a rotating storage medium. Generally hard disk drives used for portable applications are physically small and rugged devices employing embedded servo control for positioning of the actuator. A portable disk drive employing embedded servo can be significantly impaired by external shocks and vibrations. Embedded servo pattern information is typically provided on the surface of the disk in a number of servo sectors extending generally outward from the center of the disk at regularly spaced intervals around the disk. Because the portion of the disk used for the embedded servo information cannot be used to store data, it is desirable to reduce the number of servo sectors (i.e., space the servo information on the disk as far apart as possible). At each servo sector the transducer, which tends to drift off of a desired track location between servo sectors, may be realigned over the center of the track. The farther apart the servo information is spaced, however, the more likely it is that the head will move sufficiently off of the proper track location to cause an error. External shocks and vibrations tend to cause more movement in the transducer between servo sectors increasing the likelihood that the transducer will move off of the track prior to reading the next servo sector.

As the above examples illustrate, current storage devices fail to adequately provide a mechanism to account for the various external influences resulting from the environment in which the disk drive is operating. Accordingly there exists a need for an improved storage device which accounts for the environment in which the device is operating.

SUMMARY OF THE INVENTION

Generally, the present invention provides a storage device having an optimized storage mechanism rotational velocity which accounts for the various external influences resulting from the environment in which the disk drive operates. In one particular embodiment, the present invention is implemented in the form of a device and method for controlling the rotational velocity of a rotating storage medium in a storage device. The environmental condition in which the storage device is operating is determined and the rotational velocity of the rotating storage medium is selected based on the environmental condition. Sensors may be provided in the storage device to detect the environmental condition or environmental information may be entered by the user.

The above summary of the present invention is not intended to present each embodiment or every aspect of the present invention. Rather, the invention will be understood by reference to the figures and the associated description which follow.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alterative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention provides an improved storage device, in which the environment in which the storage device is being operated is used to control the operation of the storage device. As described more fully below, in accordance with an embodiment of the invention the rotational velocity of a rotating storage medium is changed based on the operating environment of the storage device. The invention relates in general to any storage device employing a rotating storage medium such as magnetic and optical disk drives, CD ROMs and the like. The exemplary embodiments provided below describe a disk drive for purposes of illustration. The implementation of the described features in other types of storage devices will be apparent from the description.

Figure 1:
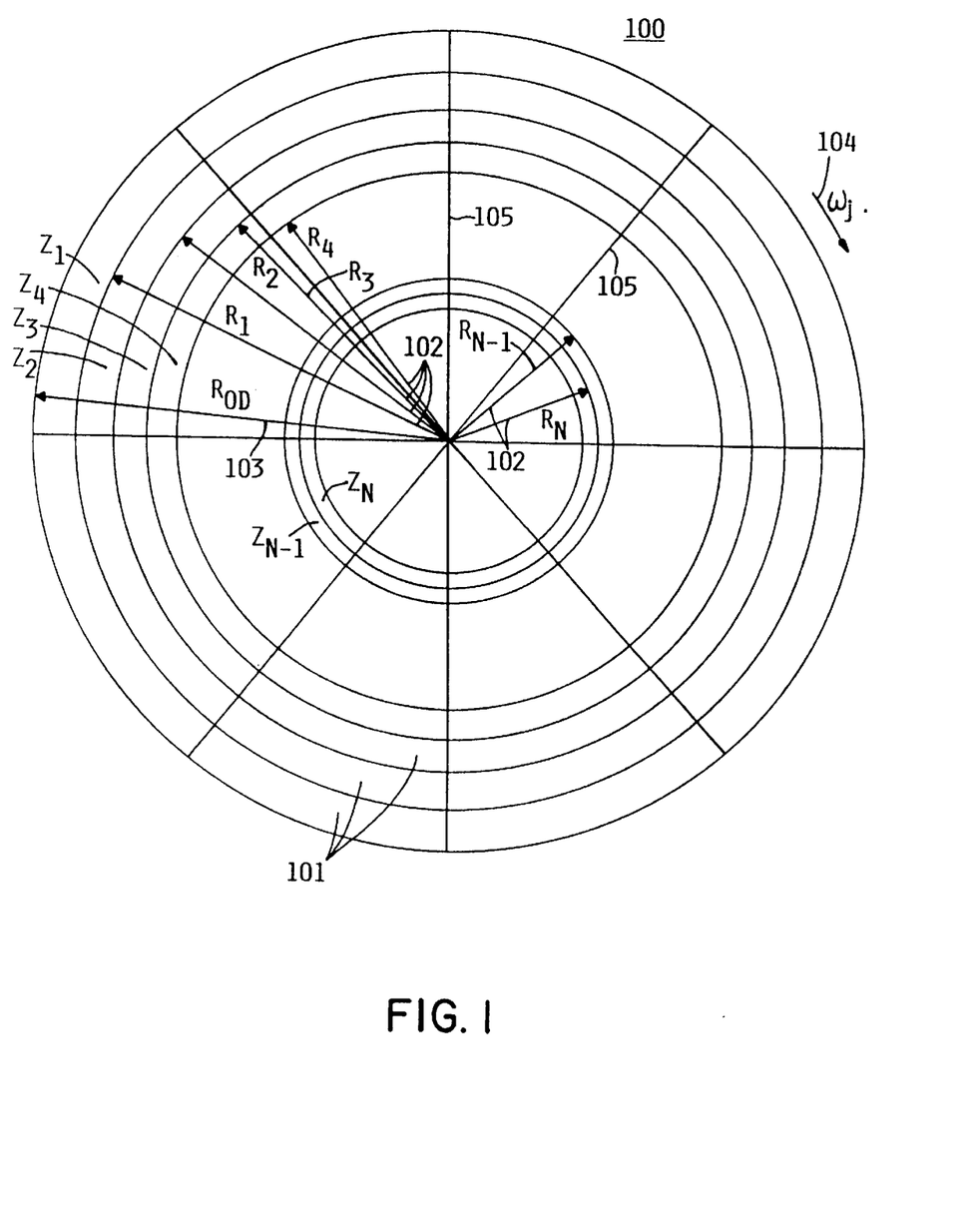
FIG. 1 illustrates a diagram of a disk surface.

A diagram illustrating a disk surface is illustrated in FIG. 1. The disk surface includes a number of data track locations (not shown) provided around the disk. The track locations correspond to concentric data tracks which may be either a number of concentric circles or one or more continuous concentric spiral tracks. The density of data tracks may be on the order of thousands of tracks per inch (TPI). The disk is also provided with embedded servo information which extends as a thin wedge in a generally outward direction from the center of the disk as illustrated by lines 105.

The disk 100 is rotated by a spindle motor at a velocity $\omega_j$ in the direction of arrow 104. As described more fully below, in accordance with an embodiment of the invention, the disk may be rotated at two or more discrete velocities $\omega_j$. The particular velocity $\omega_j$ used can be determined on the basis of the operating mode in which the disk drive is being used.

In accordance with an embodiment of the invention, a disk storage device is provided which uses a number of different discrete disk velocities $\omega_j$ selected on the basis of the operating environment in which the disk is being used. One or more of a number of different conditions may be used to determine an appropriate operating disk velocity.

Figure 2:
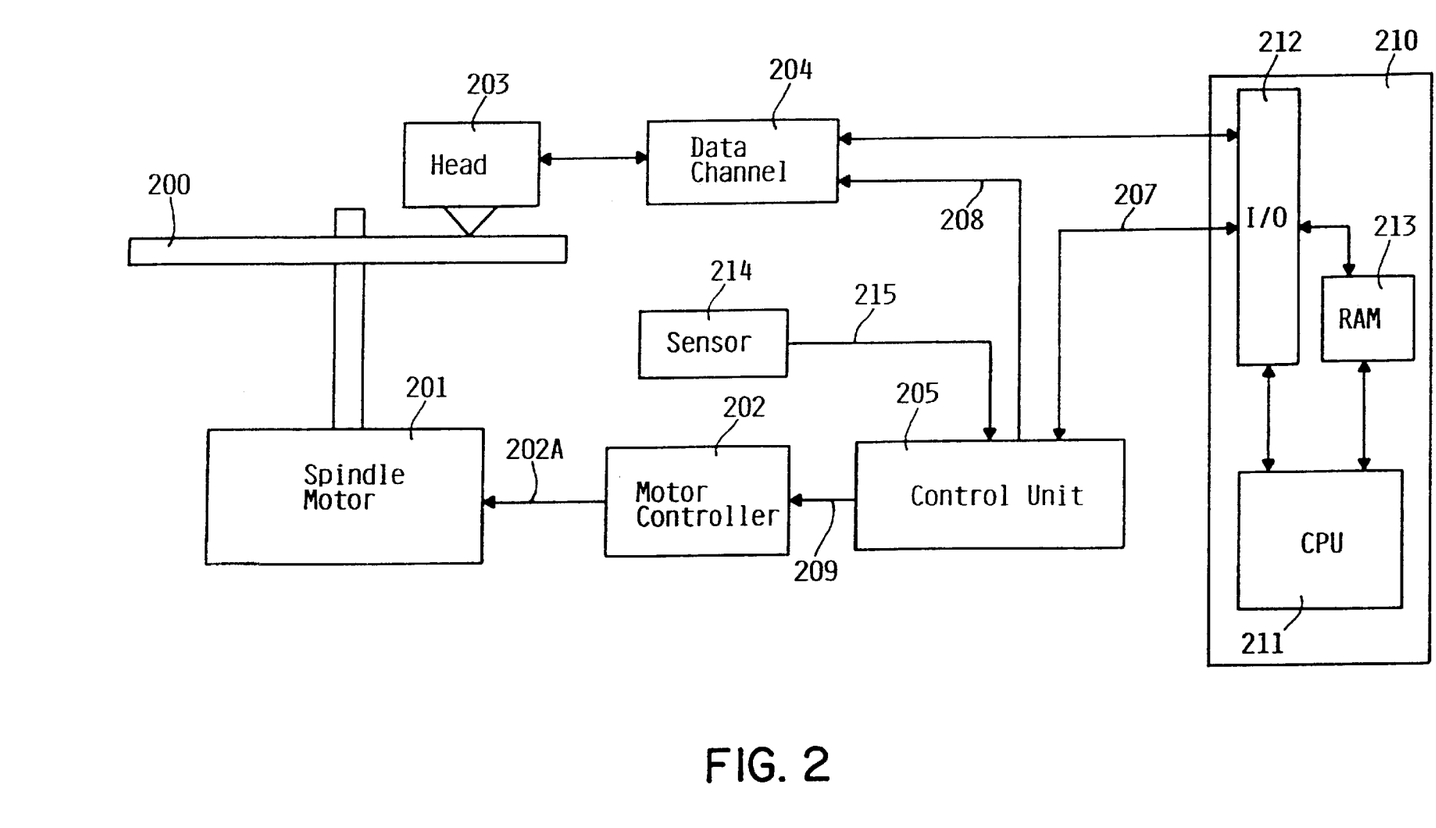
FIG. 2 depicts a block diagram which exemplifies an embodiment of the present invention.

Components of an exemplary disk drive capable of controlling the spindle velocity in response to environmental condition are illustrated in FIG. 2 in block diagram form. In FIG. 2, a disk 200 is rotated by a spindle motor 201. The rotational velocity of the spindle motor 201 is controlled by a motor controller 202. The motor controller 202 provides a control signal 202A to the spindle motor 201 which causes the spindle motor 201, and hence the disk 200, to rotate at selected discrete velocities. A transducer 203, such as a read/write head, is positioned adjacent the disk 200 to read and/or write information to and from the surface of the disk 200.

The transducer 203 may be mounted to, for example, a rotary actuator (not shown) to position the transducer over a desired track location. The transducer 203 is connected to a data channel 204 which may be used to read and write signals from and to the disk. It is noted that because the disk 200 is rotated at different velocities the data channel 204 must be capable of reading and/or writing data at number of different frequencies, each corresponding to one of the discrete rotational disk velocities used by the disk drive. In a read operation, for example, the transducer 203 provides a raw signal of information read from the disk to the data channel 204 which extracts data from the signal at the appropriate frequency for the given disk velocity. The data read from the disk 200 is supplied from the data channel 204 to I/O interface 212 which processes the signal for use by the CPU 211 of a computer 210 in which the disk drive is provided.

A sensor 214 is provided to sense one or more conditions related to an operating environment in which the disk drive is being operated. The output from the sensor 214 may be used by a control unit 205 to determine an appropriate disk velocity. The control unit 205 is connected to the data channel 204 and the motor controller 202 and is used to change the operational rotational velocity of the rotating storage medium and to establish an appropriate operating frequency to read and/or write data to the storage medium in response to a condition signal 215 from the sensor 214.

The control unit 205 may also be coupled to the computer 210 to receive a control signal 207 from the processing circuitry 212. The control signal 207 provides additional information which may be used by the control unit 205 to determine the appropriate disk velocity. For example, the disk velocity may be changed, or maintained constant, regardless of the sensed condition as directed by an input from a user of the computer. Also, in certain circumstances it may desirable to always write data to the disk at the same disk rotational velocity. In such situations, the control signal 207 may inform the control unit 205 of the type of operation to be carried out to ensure that the appropriate disk velocity is being used.

The control signal 207 may also be used to provide a signal indicative of environmental operating conditions in addition to or in lieu of the condition signal 215 output from the sensor. Such operating environment information may be entered by a user of the system in which the storage device is connected. For example, a computer having a disk drive capable of altering the spindle speed in response to environmental conditions may be used to prompt the user to input the environmental conditions. The user may enter into the computer an indication that the computer is being used in an airplane. This information may be provided, via control signal 207, to the control unit 205 which in turn appropriately adjusts the spindle speed.

Using the condition signal 215 and/or the control signal 207, the control unit 205 provides a velocity control signal 209 to the motor controller 202 to specify a disk velocity. As noted above, the condition signal 215 and/or the control signal 207 inform the control unit 205 of an operating environment in which the disk drive is operating. For example, the sensor may include an accelerometer mounted in the disk drive housing to detect vibrations and shocks. If the amount of vibration or shock experienced by the disk drive is above a set threshold, the spindle speed may be increased to provide better servo control by increasing the sampling rate of embedded servo information. In other words, by increasing the disk velocity, the rate at which the transducer encounters the servo information is increased thereby providing better servo control. The heads will also typically fly higher at the increased disk velocity which will reduce the probability of head-to-disk contact.

As will be appreciated, different types of sensors may be used to determine an appropriate spindle speed. An atmospheric pressure sensor may be provided to detect the atmospheric pressure inside the disk drive housing. As will be appreciated, in a typical disk drive the heads will have a lower flying height at lower atmospheric pressures such as when the disk is being used in an airplane. In general the flying height of a head is a function of the rotational velocity of the disk beneath the head. For example, in certain disk drives as the disk velocity is increased the flying height of the head is also increased. Thus, when the atmospheric pressure drops below a desired threshold it may be desirable to increase the spindle velocity. It should be appreciated, however, that for certain slider configurations the inverse is true such that increasing the disk velocity tends to decrease the head to disk spacing. In general, the flying height as a function of spindle speed may be determined for a particular disk drive and disk velocity can be increased or decreased in order to appropriately adjust the flying height.

It is noted that the pressure sensor may be eliminated by having the user enter directly the altitude at which the disk drive is operating. This value may provided to the control unit 205 via control signal 207 to control the disk velocity. In this manner, the flying height can be optimized for the altitude at which the storage device is operating. Such a feature may be advantageously incorporated into desktop as well as portable computers. A set-up operation for the disk drive may inquire of the user the altitude at which the computer is being used. The disk speed may then be selected to optimize the flying height of the head for the disk drive at the altitude input by the user.

Rather than sensing atmospheric pressure, the system may directly sense the flying height of the heads and adjust the speed of the disk to increase the flying height when the flying height is reduced. Flying height may be reduced, for example, as a result of debris forming on the slider. A reduction in flying height may be detected using known techniques for detecting flying height such as harmonic ratio flyheight (HRF) detection methods.

It is noted that various other environmental conditions may indicate that an increase or decrease in the spindle speed from the nominal or normal operating spindle speed may be desirable. For example, the sensor 214 may sense a temperature inside the disk drive. When the sensed temperature exceeds a particular threshold, the control unit 205 may reduce the spindle speed to cool off the disk drive. As can be appreciated, when more than one condition is sensed or input from by the user, competing interest may be encountered. For example, the conditions may suggest both to increase and decrease the spindle speed. It will be appreciated that priorities can be established for conditions or various combinations can be taken into account and a spindle speed for the combination can be specified by the control unit 205.

The I/O interface 212 processes information and provides an interface to the CPU 211 of the computer 210 using the disk storage device. A more detailed description of the operation of such circuitry is provided with the detailed example described below.

Figure 3A:
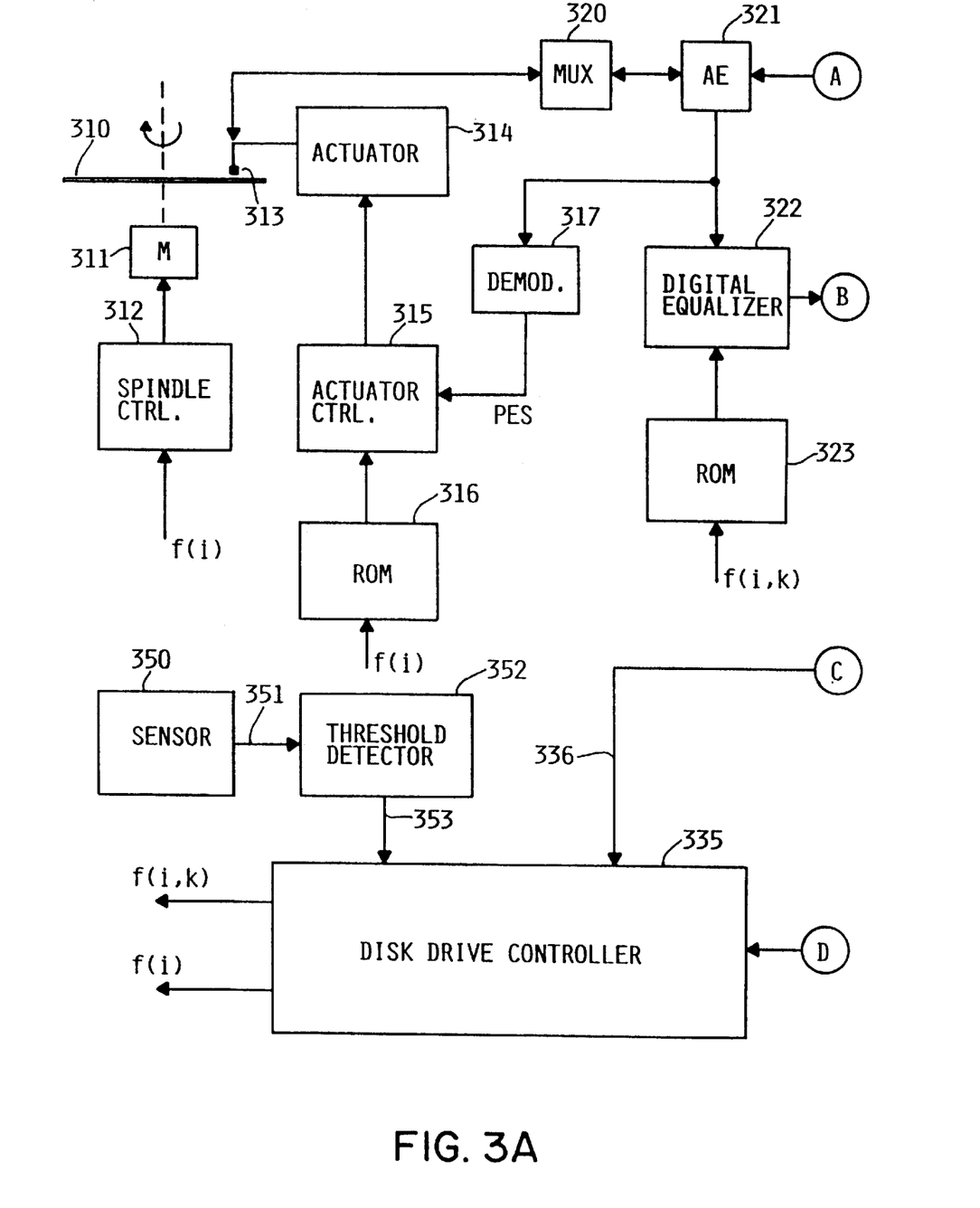
FIG. 3 depicts a more detailed exemplary embodiment of the present invention.
Figure 3B:
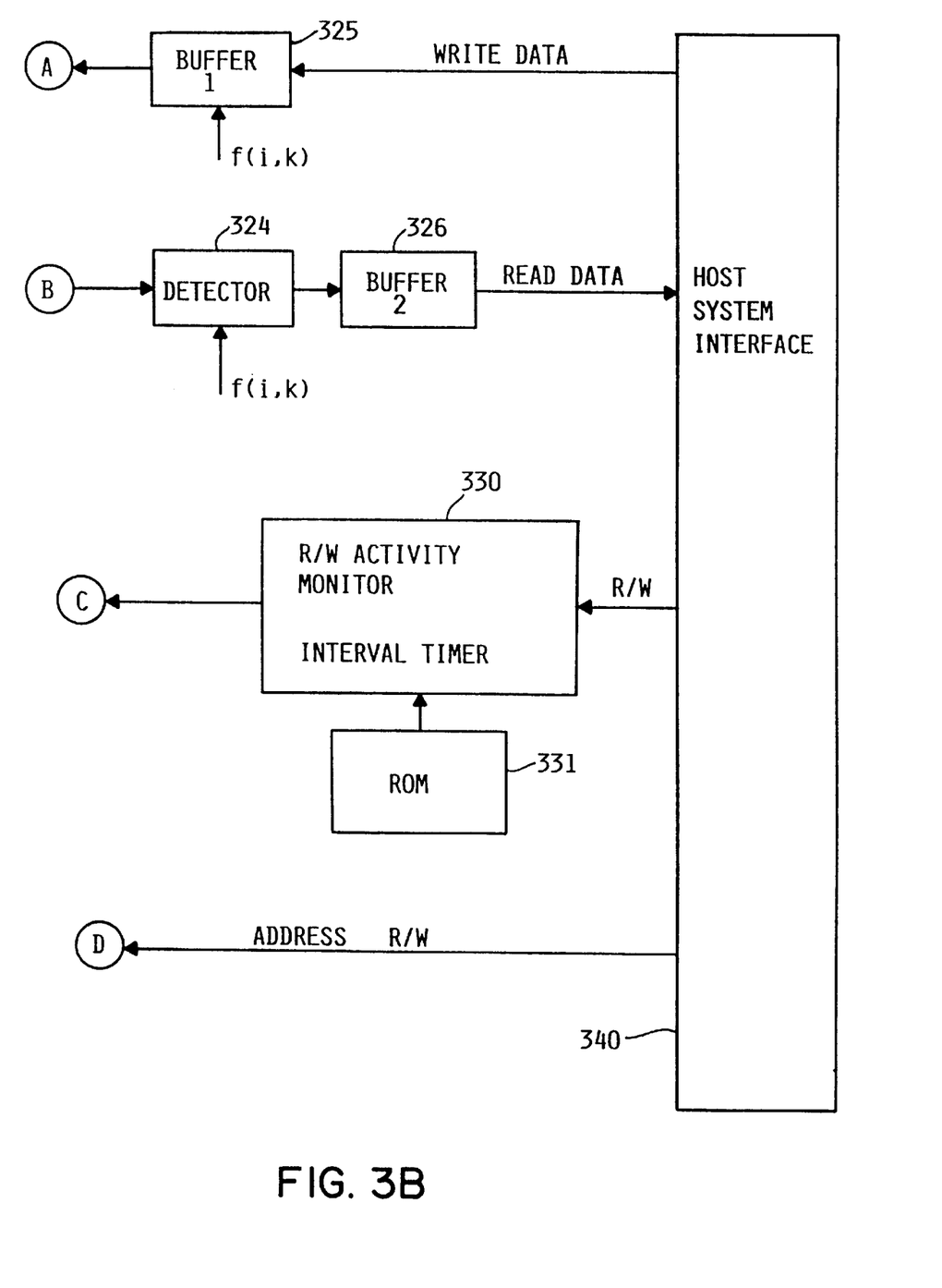

FIG. 3 illustrates a detailed exemplary embodiment where the rotational velocity of the disk may be modified in response to the sensed condition. The embodiment illustrated in FIG. 3 utilizes a disk having adjacent track locations banded into a plurality of zones, each zone having a uniquely assigned zone frequency for a given spindle velocity. This technique, used to increase the storage capacity of a rotating disk, is commonly referred to as zone bit recording (ZBR). To facilitate an explanation of the system depicted in FIG. 3, the principles behind ZBR are briefly described.

At a constant spindle velocity, the linear speed of the disk surface as it moves past the transducer varies as the transducer is moved from the inner portions of the disk to the outer edges of the disk. In particular, the linear speed of the disk surface is greater at the outer edge of the disk. ZBR takes advantage of this higher linear velocity by increasing the frequency at which data is recorded at the outer portions of the disk in order to increase the linear density of the recorded data.

Ideally, the write frequency could be selected as a function of the radial position of the head such that the linear density of recorded transitions, such as data, is the same across the entire surface of the disk. Thus, in such a system the linear density of data recorded on the disk is constant for each track on the disk. In practice, however, it is not necessary to change the density for each track location since it is typically desirable to have an integral number of data blocks on each track location. Rather, the disk may be divided into a number of concentric zones made up of a band of adjacent track locations. The track locations correspond to concentric data tracks which may be either a number of concentric circles or one or more continuous concentric spiral tracks. A zone frequency is conventionally assigned to each zone and is used to write data to and read data from the disk. The zone frequency is typically selected for each zone such that the linear density of data at the innermost track of each zone is substantially constant. In this manner, the overall storage capacity of the disk can be significantly increased.

Referring to FIG. 1, disk 100 has N zones 101 each made up of a band of tracks or track locations (not shown). The zones 101 progress from zone $Z_1$ at the outer diameter of the disk to zone $Z_N$ at the inner diameter of the disk. The zones 101 may be defined by the inner radii 102 of the zones. The radius $R_i$ corresponds to the inner radius of zone $Z_i$. The radius 103 of the disk defines an outer diameter $R_{OD}$ of the disk. When different spindle speeds are used in accordance with an aspect of the illustrated embodiment, the write frequency for a particular zone is selected such that the linear density for data written to the inner track of each zone is substantially constant.

As noted above, data may be read from and/or written to the disk at two or more spindle velocities. Thus, the linear data rate (i.e., the rate at which data is presented to or written by the head) also varies as the speed of the spindle motor is changed. In other words, the rate at which data bits, represented by transitions in the signal, are presented to the transducer for a given zone varies as the spindle motor speed changes. Hereinafter, the rate at which data is presented to a transducer at a given spindle velocity will be referred to as the "zone bit frequency". Thus, as used herein, the term "zone bit frequency" represents the rate at which bits of data are presented to (or written by) the transducer. This is a function of both the linear density of the data in the zone and the rotational speed of the disk.

In FIG. 3, a recording head 313 is positioned to read and write information from and to the surface of disk 310. It is noted that while only a single disk is illustrated in FIG. 3, multiple disks and heads may be used. An actuator assembly 314, including a voice coil motor (VCM), is provided to move the head 313 relative to the rotating disk 310. A spindle motor 311 is provided to rotate the disk 310. The spindle motor 311 is controlled by a spindle controller 312. The spindle controller 312 may be implemented with a phase locked loop (PLL) such that the speed of the spindle motor 311 may be controlled by applying a frequency control signal f(i) to the spindle controller 312. It is noted that the various control elements illustrated in FIG. 3, while shown as discrete blocks may be implemented on a microprocessor using microcode. Moreover, a number of different microprocessors may be used, each implementing one or more of the described functions. The present description describes the functional operation of the various elements whether implemented as microcode on one or more microprocessors or as discrete circuits.

An adaptive actuator controller 315 is provided to control the actuator 314. The adaptive actuator controller 315 uses a set of coefficients stored in a read-only memory (ROM) 316. The ROM 316 stores one set of coefficients for each discrete rotational velocity of the disk 310. The disk velocity is changed under control of the frequency control signal f(i) from one discrete velocity to another. As the disk velocity is changed, the adaptive actuator controller 315 loads a new set of a coefficients corresponding to the new disk velocity. The different sets of servo coefficients are required because of the change in sampling rate of servo information. The servo information read by the transducer 313 and servo information written on the disk is demodulated by demodulator 317 and is used to produce a position error signal (PES). In this manner, the dynamic operation of the adaptive actuator controller 312 is adaptively changed to optimize actuator access and tracking performance. The position error signal is used for servo control to keep the head 313 aligned over the correct track location. If the disk 310 is slowed down, for example, the sampling of the position error signals will be slower than when the disk 310 is rotated at the faster nominal speed. The adaptive actuator controller 315 must be dynamically reconfigured to work with the proper sampling rate of the position error signal.

Information read from or written to the disk 310 passes through a multiplexer 320. The multiplexer 320 selects a head from various heads respectively corresponding to multiple disk surfaces (only one head 313 is shown in FIG. 3). The output of multiplexer 320 is coupled to the arm electronics (AE) module 321. The arm electronics module 321 is coupled to buffer 325 to receive data to be written to the disk during a write operation. Buffer 325 is coupled to a host system interface 340 which in turn is coupled to the host system such as the processing unit of a computer. Data is typically passed from the host system interface 340 to the buffer 325 at a fixed rate (i.e., at a fixed number of bytes-per-second). The data is then stored in buffer 325. The data is clocked from the buffer 325 to the disk, via the arm electronics module 321 and the multiplexer 320, at a rate (or frequency) which depends on the disk velocity and the zone in which the data is to be written. Thus, the buffer is provided with a control signal f(i,k) which is dependent upon the disk velocity denoted by the letter "i" and the zone denoted by the letter "k". In other words, write data enters the buffer at constant speed and is output at a variable speed dependent upon disk velocity and zone information.

In a read operation, data is read and passed to the multiplexer 320, amplified by the AE module 321 and then provided to an adaptive digital equalizer 322. The adaptive digital equalizer (filter) 322 compensates for amplitude variation in bit frequency arising, for example, in the head 313 and/or the arm electronics module 321. The digital equalizer 322 amplifies all frequencies of the recorded signals such that the overall amplification of each frequency is of the same amplitude. The digital equalizer 322 is coupled to a ROM 323 to receive a set of coefficients corresponding to the spindle speed (disk velocity) and the zone from which the data is read in response to the control signal f(i,k). The coefficients are precalculated values to be used to optimize the operation of the digital equalizer 322.

The output of the digital equalizer 322 is provided to the detector 324. The detector 324 is also provided with the control signal f(i,k) to optimize the clocking and detection operation of the detector on the basis of the spindle speed and the particular zone from which the data was read. The detector 324 detects data bits in the signal read using the head 313. Once the data bits now have been detected, error correction for soft errors may be further carried out in the detector 324. The data may then be passed into the buffer 326 and subsequently read from the buffer 326 to the host system interface 340 at a frequency which is accepted by the interface. This frequency, for example, may be the same as the frequency at which write data is received by buffer 325 from the host system interface 340.

A demodulator 317 is also shown receiving the output from the arm electronics module 321. The demodulator 317 extracts servo information from a signal read by the head 313 from equispace radial servo patterns written on the disk surface. From the servo information the position error signal (PES) is derived and is provided to the actuator controller 315 to control the positioning of the head as described above. A detailed analysis of the above operation is provided in U.S. Pat. No. : 5,285,327 entitled "Application for Controlling Reading and Writing in a Disk Drive", issued Feb. 8, 1994; U.S. Pat. No. 5,440,474 entitled "Magnetic Recording disk with Equally Spaced Servo Sectors Extending Across Multiple Data Bands", issued Aug. 8, 1995; and U.S. Pat. No. 5,210,660 entitled Sectored Servo Independent of Data Architecture", issued May 11, 1993.

The control signals f(i) and f(i,k) are generated by a disk drive controller 335. The disk drive controller 335 is coupled to communicate with the host system interface 340 as indicated by line 341. The host system interface 340 provides addressing information, read/write commands designating the type of operation to be performed, and the like, to the disk drive controller 335. The address information may include, for example, a head number, a cylinder number or track number as well as a data sector number. The disk drive controller 335 may also communicate information to the host system interface 340. For example, the disk drive controller 335 may communicate status information to the host system interface along line 341. When the disk drive is initially powered up, the controller may perform operations independent of the host. While performing such operations the disk drive controller 335 may inform the host system interface 340 that the disk drive is busy and will further notify the host system interface when the drive is ready to perform access operations.

The disk drive controller 335 also receives a control mode signal 336 indicative of a desired operating frequency for the drive. Control mode signal 336 may be used to change the spindle speed of the disk drive on the basis of operation considerations of the disk drive. For example, signal 335 may be used to reduce the spindle speed in order to conserve power consumption of the disk drive in response to a determination by an activity monitor 330 that a power savings mode should be initiated. The operation of the such a power savings device is described in the related application Ser. No. 08/625,334, now U.S. Pat. No. 5,787,292 filed on Apr. 1, 1996, entitled "Power Saving Method and Apparatus for use in Multiple Frequency Zone Drives" and having an attorney docket number IBM RO995-090. The control signal 335 may also include user settable environmental conditions which may be used by the disk drive controller 335 to control the spindle speed.

The disk drive controller 335 uses the control mode signal 336 to control, for example, a variable frequency oscillator in the disk drive controller 335. The frequency of this oscillator may then be used as a master frequency to control other elements in the disk drive. For example, the frequency of the oscillator may be provided to the phase locked loop (PLL) of the spindle controller 312 to control the spindle speed.

The output of a sensor 350 is provided a threshold detector 352 which generates a control signal 353 which is used by the disk drive controller to change the spindle speed by altering the output signal f(i) provided to the spindle controller 312. Sensor 350 is provided to sense one or more conditions representative of an operating environment of the disk drive. For example, sensor 350 may be an accelerometer fixedly mounted to the base casting of the disk drive housing. When the disk drive experiences vibrations or shock, the accelerometer will output a control signal indicative of the shock. The magnitude of the shock or vibration may be determined by providing the output of the accelerometer to a threshold detector. The threshold detector compares the output from the accelerometer to determine whether the experienced shocks or vibration is within acceptable operating parameters.

In addition to using the output from the accelerometer to control the spindle speed, other types of control may also be carried out. For example, when the shock or vibration exceeds an upper threshold, it may be determined that disk drive access operation (e.g., read or write operations) should not be carried out. Alternatively, the disk drive controller 335 may inhibit write operations while allowing read operations. This is because write operations present a greater risk if the head moves significantly off track since adjacent tracks of data may be damaged by writing into the adjacent track.

If the output from the sensor is below the upper threshold limit, but is also above the normal threshold, the disk drive controller 335 may control the spindle motor to increase the rotational velocity of the disk. In this manner, the head flying heights in a drive having a positive correlation between disk velocity and flying height may be increased providing increased marginal safety. Moreover, stiffer actuator control will be obtained due to the increased frequency of servo information being provided to the actuator controller 315.

While in FIG. 3 a single sensor 350 is illustrated, as noted above, a number of different sensors may be provided to sense the various operating environments and conditions. The outputs from the multiple sensors are respectively provided to threshold detectors related to the sensed parameters. These various sensors may be used in combination to determine the overall control of the disk drive. Alternatively, the sensors may be eliminated and the operational environment may be determined solely from user input.

The disk drive controller 335 may also use the information obtained from the sensors and/or user to determine whether or not to initiate other operations within the disk drive. For example, in the system illustrated in FIG. 3 a power savings mode is provided which reduces the spindle speed of the drive. When the activity monitor 330 determines that activity has dropped below a particular threshold, a signal is sent along line 336 to initiate a power savings mode. While the disk drive is operating in its low power mode, the effectiveness of the servo control is reduced for the reasons described above. A lower threshold of acceptable vibrations or shock may be set for the power savings mode. The lower threshold may be used to determine whether it is safe to remain in the low power mode. While a certain level of vibrations may be acceptable at a nominal disk speed, these vibrations may be unacceptable when rotating the disk velocity at a lower speed. The sensor output may be used in this fashion to exit the low power mode and resume nominal operating speed in response to increased vibrations.

It should be appreciated that other types of sensors could be employed depending upon the environmental condition to be accounted for and appropriate thresholds can be determined based on the operating environment and the overall storage device structure.

When the spindle speed is changed, the frequency at which data is to be read from and written to the disk changes. In a multiple frequency zone drive as the spindle speed changes in response to the control signal 353, the zone bit frequency changes for each of the various zones. If a number of different spindle speeds are used, the overall complexity of the system may be significantly increased. For example, in the embodiment illustrated in FIG. 3, for each discrete spindle velocity the adaptive digital equalizer (filter) 322 must be loaded with filter configuration data for each zone from ROM 323. The configuration data is unique for each different zone bit frequency. Thus, as the number of zones and discrete spindle velocities used by the storage device increase, the number of different zone bit frequencies also increases. An increase in the number of different zone bit frequencies is even more problematic when analog or hybrid digital/analog data channels are used. As described more fully later, analog channels must include separate analog front end components such as resistors and capacitors, for each different zone bit frequency used, increasing significantly to the cost and physical size of the data channel. Moreover, in certain small form factor disk drives the needed space on an electronic circuit board may not be available.

In view of the above considerations, it is desired that the number of different zone bit frequencies used by a storage device performing access operations at different spindle speeds be minimized. As described more fully below, by special partitioning of the tracks into zones the complexity of the system may be decreased.

Referring to FIG. 1, an operating frequency $f_i$ in hertz (Hz) for zone i may determined by the relationship $$f_i = d_i(2\pi r_i \omega_j/60),$$

where $d_i$ is the linear density at $r_i$ in zone $z_i$, $r_i$ is the inner radius of zone $z_i$, and $\omega_j$ is the discrete j-th disk annular velocity in revolutions per minute (RPM). This equation may be reduced to $$f_i = 0.1047 d_i r_i \omega_j.$$

and assuming that the maximum linear density for each zone is constant (i.e., $d_{i=d0}$) for zones of equal width, the equation becomes $$f_i = 0.1047 d_i r_i \omega_j.$$

In accordance with one embodiment of the invention, a specific allocation of tracks into zones by selecting the radii for the inner track for each zone is used to minimize the complexity and cost associated with a data channel. In particular, the inner track radii defining each zone may be selected as a geometric progression which is a function of radius. In general, the inner radius ri, defining each zone, is determined according to a geometric progression which maintains a substantially constant ratio of radii between adjacent bands or zones. In other words, $r_i/r_{i+1}$ is substantially equal to K, where K equals a constant.

As described more fully below, this method of banding tracks into zones provides for a high degree of overlap in zone bit frequencies between zones as the spindle velocity is reduced. Using this method, a drive having N zones and operating at M different discrete spindle (disk) speeds will have a total number of different required zone bit frequencies equal to N+M−1. For example, a drive having 10 recording zones and operating at 10 discrete spindle speeds will require channel capable of handling 19 (i.e., 10+10−1= 19) different zone bit frequencies.

In contrast, the number of different zone bit frequencies required for a disk banded according to a simple arithmetic progression is determined according to the relationship N+(((M*M)−N)/2). In the above example, the number of zone bit frequencies which the channel must handle equals 55 (i.e., 10+(((10*10)−10)/2)=55). Thus, partitioning the tracks into zones in accordance with a geometric progression offers significant advantages in terms of reduced channel complexity and cost.

The advantages obtained by partitioning the tracks into zones according to a geometric progression in comparison with an arithmetic progression will be better understood by the following discussion in connection with FIGS. 4–8.

Consider a disk having the inner band radii $r_i$, of each zone, follow a geometric progression. This may be expressed as $$r_i = r_{OD}^{1-i\rho}, \text{ for } i=1,2,\ldots,N,$$

where $\rho$ is a substantially fixed coefficient for the progression.

The ratio between two adjacent zone radii $r_i$ and $r_{i+1}$ is constant providing the relationship:

$$r_i/r_{i+1} = r_{OD}^{\rho},$$

for $i=1,2,\ldots N-1$.

For a disk having an inner radius $r_{ID}$, the coefficient, $\rho$, for a given number of data bands can be determined as follows:

$$\ln(r_{ID}) = (1-N\rho) \ln(r_{OD}),$$

which may be rewritten as:

$$\rho = 1/N(1-\ln(r_{ID})/\ln(r_{OD}))$$

By way of example, consider a 2.5 inch disk divided into 10 zones (N=10) and having an inner radius $r_{ID}$ of 14 mm, an outer radius $r_{OD}$ of 29.7 mm. The value of $\rho$ for a disk having these dimensions can be calculated as follows:

$$\rho = 1/10(1-\ln(14)/\ln(29.7)) = 0.022178.$$

Using this value for $\rho$ the inner radius of each of the 10 zones will be determined as the geometric progression:

$$r_i = r_{OD}^{(1-0.022178i)}.$$

By way of contrast, the inner radii of each zone may be determined as an arithmetic progression. Here the difference between two adjacent inner zone radii, $r_i$ and $r_{i+1}$ is a constant b providing the relationship $$r_i - r_{i+1} = b,$$

In this case, the radii $r_i$ can be expressed as $$r_i = r_{i-1} - b,$$

which yields the following radii $$r_1 = r_0 - b;$$

$$r_2 = r_1 - b = r_0 - 2b;$$

$$r_3 = r_2 - b = r_0 - 3b;$$

* * *

$$r_k = r_{k-1} - b = r_0 - kb.$$

Recalling the expression $f_i = 0.1047 d_o r_i \omega_j$ and by substitution, the following equation for $f_i$ may be written:

$$f_i = 0.1047 d_0 (r_0 - ib) \omega_j.$$

This equation can also be written as $f_i = f_{0j} - i\Delta f_{0j}$ where $f_{0j} = 0.1047 d_0 r_0 \omega_j$ and $\Delta f_{0j} = 0.1047 d_0 b \omega_j$. Thus, a general equation for the zone bit frequency can be expressed as $$f_{ij} = (k_0 - i\Delta k)\omega_j$$

where $k_0 = 0.1047 d_0 r_0$, and $\Delta k = 0.1047 d_0 b$.

When the disk is rotated at full speed (i.e., when $\omega = \omega_1$ and $j=1$), the following relationship can be derived:

$$f_{11} = (k_0 - \Delta k)\omega_1;$$

$$f_{21} = (k_0 - 2\Delta k)\omega_1;$$

$$f_{31} = (k_0 - 3\Delta k)\omega_1;$$

* * *

$$f_{i1} = (k_0 - i\Delta k)\omega_1.$$

At a lower speed, when $\omega = \omega_2$ and $j=2$, the frequencies can be calculated as:

$$f_{12} = (k_0 - \Delta k)\omega_2;$$

$$f_{22} = (k_0 - 2\Delta k)\omega_2;$$

$$f_{32} = (k_0 - 3\Delta k)\omega_2;$$

* * *

$$f_{i2} = (k_0 - i\Delta k)\omega_2.$$

In order to reduce complexity of the data channel, it is desirable to have $f_{12} = f_{21}$ so that all but one of the frequencies at $\omega_1$ are reusable at the lower speed $\omega_2$. For this to occur, $(k_0 - \Delta k)\omega_2$ must equal $(k_0 - \Delta k)\omega_1$. It is also desired that $f_{22} = f_{31}$, which means that $(k_0 - \Delta k)\omega_2 = (k_0 - \Delta k)\omega_1$.

For zone i, we need $f_{i2} = f_{(i+1)1}$ which means that $(k_0 - 1\Delta k)\omega_2 = (k_0 - (i+1)\Delta k)\omega_1$. The above constraints can be written as $\omega_2 = [(k_0 - (i+1)\Delta k)/(k_0 - i\Delta k)]\omega_1$, and for the jth speed $\omega_j$, the relationship may be expressed as $\omega_j = [(k_0 - (j+1)\Delta k)/(k_0 - \Delta k)]\omega_0$.

Consider the example described above using a 2.5" disk having the dimensions $r_{ID} = 14$ mm and $r_{OD} = 29.7$ mm with 10 zones divided into equal sized bands of approximately 1.57 mm (i.e., b=(29.7–14)/10). Assuming a linear density of data on the inner radius of each zone of 135 kilobits-per-inch (i.e., $d_0 = 5315$ bits per mm), the value of $k_0 = 0.1047 d_0 r_0 = 16527.47$ and $\Delta k = 873.67$. In this case, some of the spindle velocities, using the arithmetic progression of the inner band radii, may be determined as:

$$\omega_1 = [(k_0 - 2\Delta k)]\omega_0 = 0.9442\omega_0$$

$$\omega_2 = [(k_0 - 3\Delta k)]\omega_0 = 0.8884\omega_0$$

$$\omega_3 = [(k_0 - 4\Delta k)]\omega_0 = 0.8326\omega_0$$

$$\omega_4 = [(k_0 - 5\Delta k)]\omega_0 = 0.7768\omega_0$$

$$\omega_5 = [(k_0 - 6\Delta k)]\omega_0 = 0.7209\omega_0$$

$$\omega_6 = [(k_0 - 7\Delta k)]\omega_0 = 0.6651\omega_0$$

Using the above relations, the following comparisons can be made between the geometric and arithmetic progression methods of selecting the inner band radii of the various zones. It is noted, that the storage capacity of a disk using the above-described geometric progression is substantially the same as that of a disk using the arithmetic progression.

Figure 4:
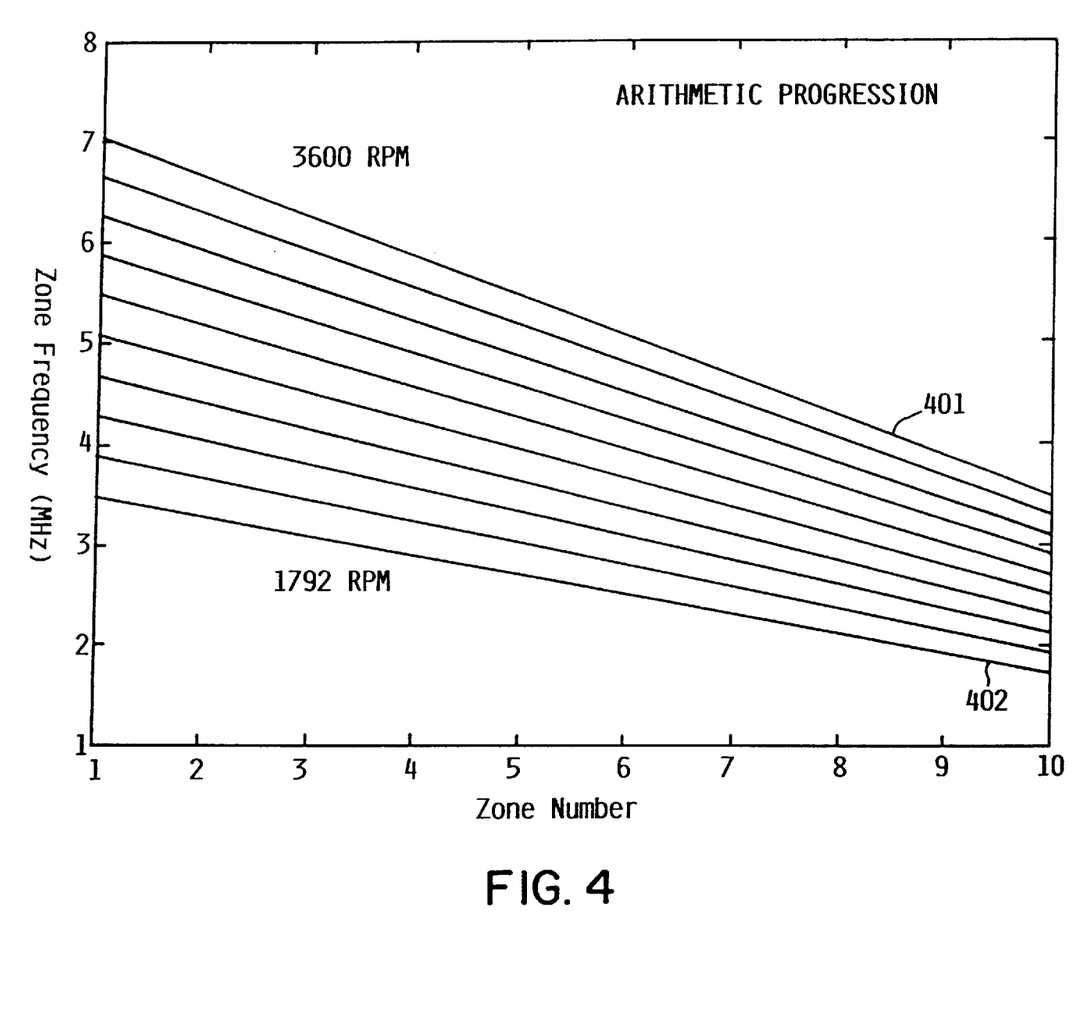
FIG. 4 illustrates a relationship between zone frequency and spindle motor velocity for tracks partitioned into zones according to an arithmetic progression.
Figure 5:
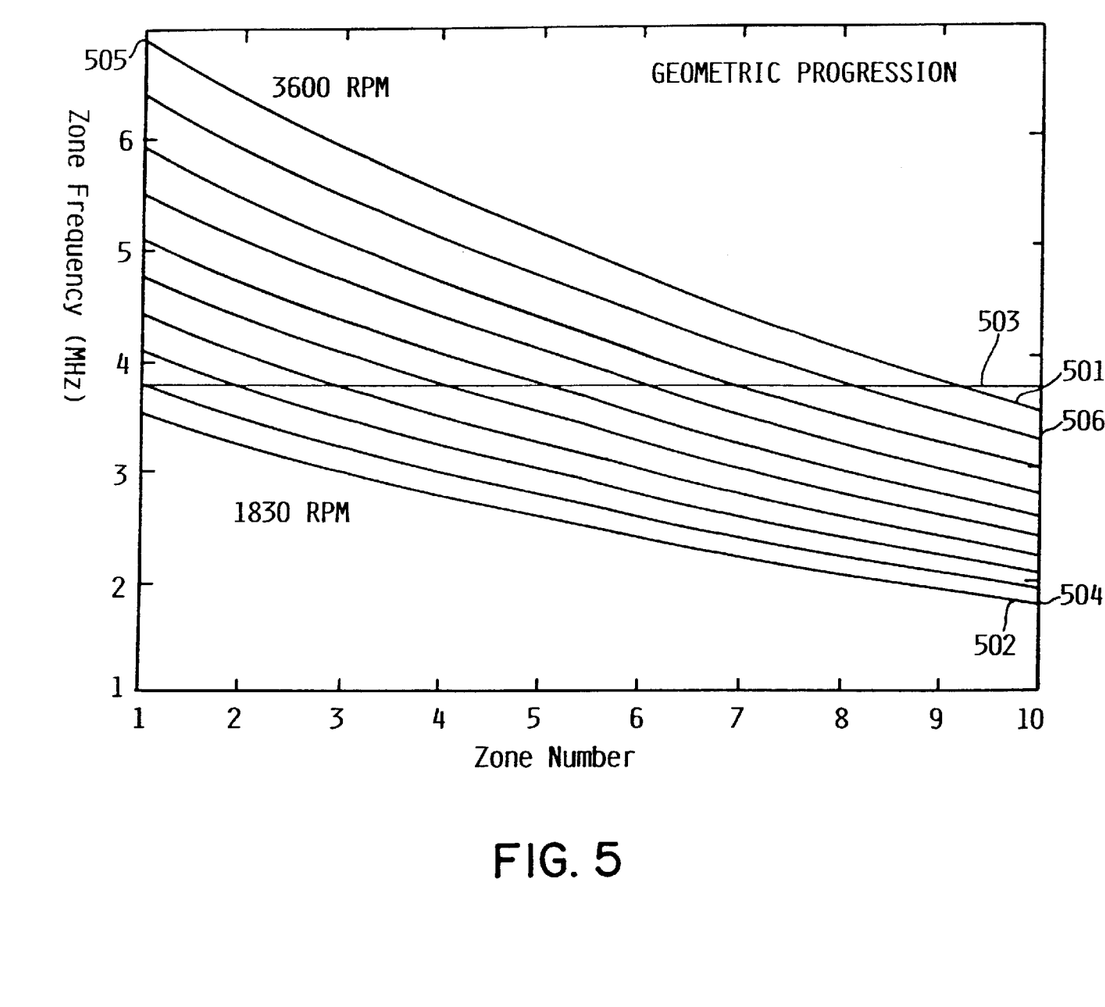
FIG. 5 illustrates a relationship between zone frequency and spindle motor velocity for tracks partitioned into zones according to a geometric progression.

In FIGS. 4 and 5, zone data rate frequencies versus the zone index position are graphed as a function of varying spindle motor speeds for zones banded using the arithmetic progression and the geometric progression, respectively. The spindle motor speed is Varied over ten discrete drive speeds between a nominal speed of 3600 revolutions per minute (RPM), represented by lines 401 and 501 to 1792 RPM, represented by line 402 in the case of the arithmetic progression (FIG. 4) and 1830 RPM, represented by line 502 in the case of the geometric progression (FIG. 5).

A comparison of FIGS. 4 and 5 illustrates various advantages obtained by using a geometric progression to allocated tracks to zones. When the graph in FIG. 5 is viewed horizontally, it is noted that the zone bit frequencies line up along a horizontal line. For example, the zone bit frequency of 3.78 megahertz (MHz) extending along line 503 is used by each of zones 1–9 at different discrete spindle motor speeds. Moreover, all but two zone bit frequencies indicated at points 504 and 505 (corresponding to frequencies 1.78 MHz and 6.90 MHz) are used by more than one zone. It is further noted that the frequencies also align vertically. This indicates that as the drive speed is reduced, the zone bit frequencies are shifted toward the outer diameter (OD) of the disk.

Figure 8A:
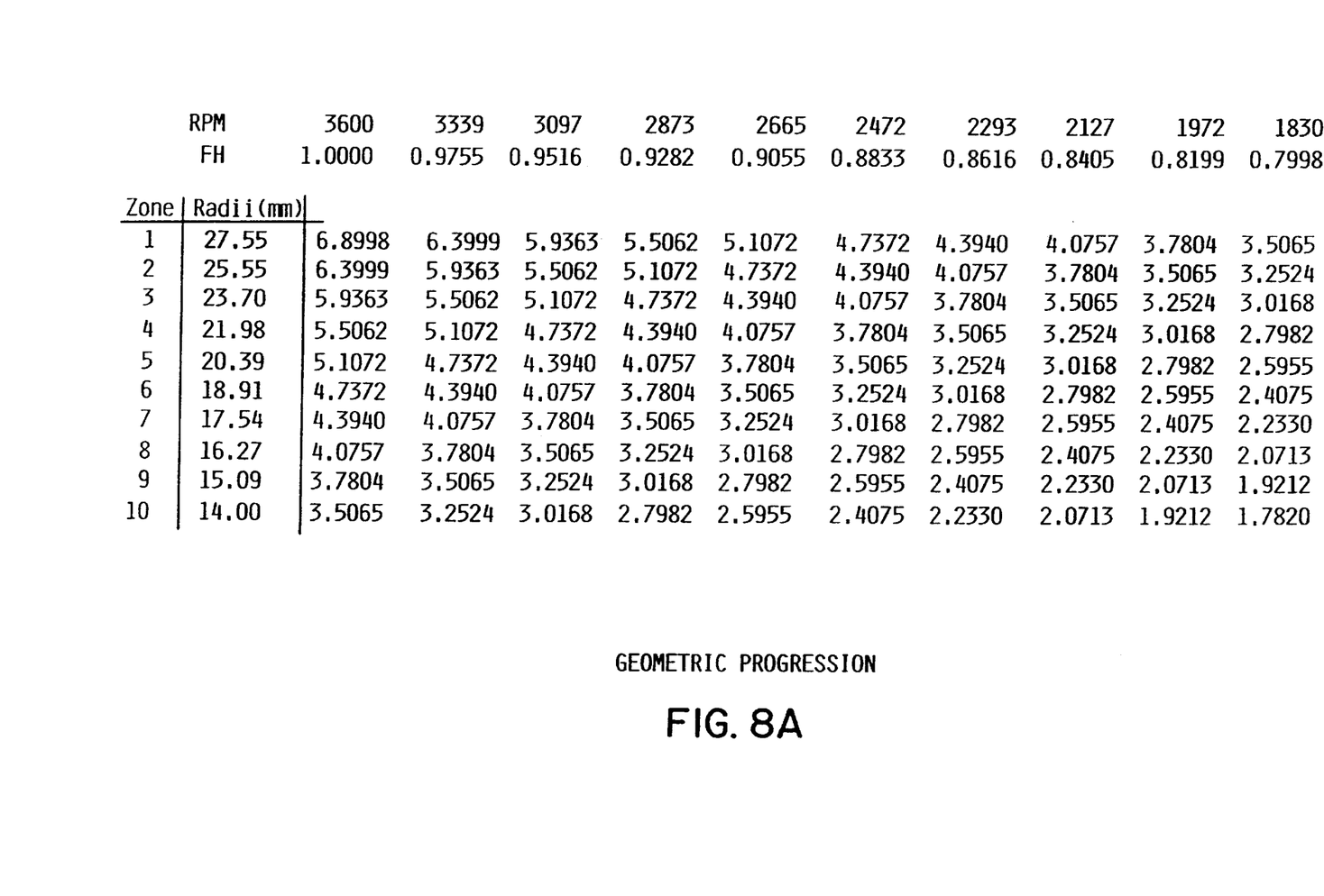
FIGS. 8A and 8B, respectively, are tables depicting the geometrically and arithmetically located zone radii, flying height and frequency as a function of varying spindle speed for a 2.5" disk drive.

Referring to the table in FIG. 8A, the following example illustrates an advantage obtained by using the geometric progression to allocate track locations to zones. In zone number 2, when the disk is rotated at a nominal speed of 3600 RPM, the zone bit frequency is 6.3999 megabits/sec (MB/sec) (i.e., 6.3999 MHz). If the drive speed is reduced to the next discrete speed of 3339 RPM, represented by line 506, the correct zone bit frequency for zone 2 is 5.9363 MB/sec. As illustrated in the graph, this frequency was used by zone 3 when the spindle speed was 3600 RPM. Similarly, the zone data rate used by zone 2 at 3600 RPM is now used in zone 1. In this matter, the zone data rates shift toward the outer diameter of the disk. At the innermost zone, zone 10 in the illustrated example, a new zone bit frequency is needed by the data channel for each reduction in spindle motor speed. It should now be appreciated that for drives having N zones and M spindle speeds, the number G of data rate frequencies required may be described by the relation G=N+M−1.

Figure 8B:
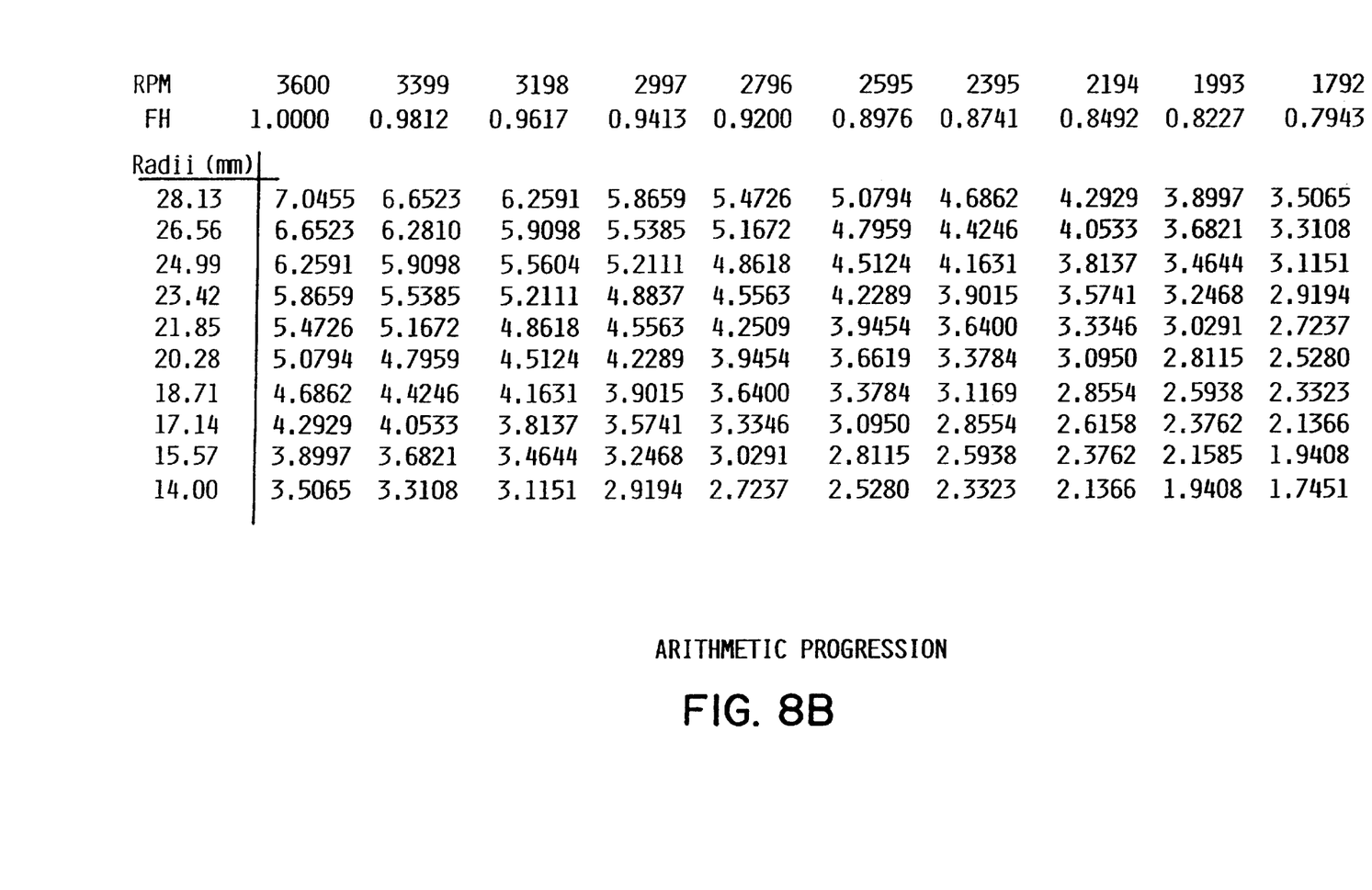

As illustrated in FIG. 4 and the table in FIG. 8B, when the rotational speed is reduced using a disk having zones banded using an arithmetic progression, the number of zone bit frequencies which may be reused by other zones is significantly less than a disk having zones allocated using the geometric progression. Thus, the complexity and cost of the data channel can be significantly reduced by using the geometric progression.

As noted above, the flying heights of the recording heads over a disk in a drive will change as the drive speed is changed. For a drive having its flying height increase with increased spindle velocity, the flying height H at a velocity V may be empirically approximated as:

$$H=(V/V_O)^{0.33}H_0,$$

where $V_0$ is the nominal disk speed, and $H_0$ is the nominal flying height at $V_0$. Referring to the drive spindle speeds illustrated in FIG. 5, and assuming that the fly-height is 50 nanometers (nm) at the nominal speed $V_0$, the fly-height at the reduced speeds are 49 nm for 3,339 RPM, 48 nm for 3,097 RPM, and 46 nm for 2,873 RPM. As described above, it may be desired to reduce the spindle speed to cool the disk drive in response to a sensed temperature which exceeds a set threshold. As noted in the above example, the flying height is reduced by only 4 nm when changing from nominal speed to 2,873 RPM. Such a decrease in flying height is within the tolerances allowed in many disk drives.

Figure 6:
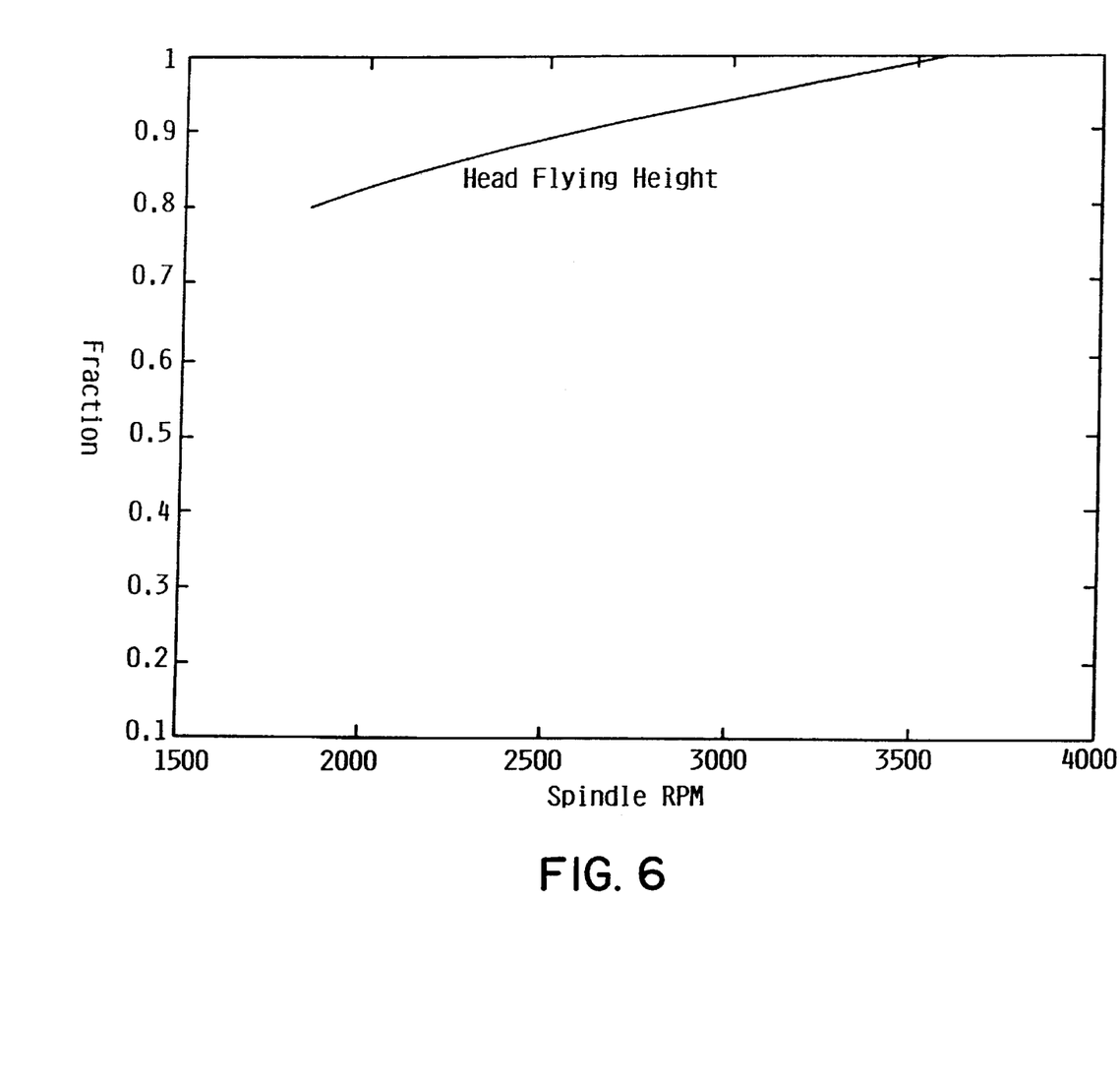
FIG. 6 illustrates a relationship between fractional head flying heights at different spindle motor velocities for tracks partitioned into zones according to an arithmetic progression.
Figure 7:
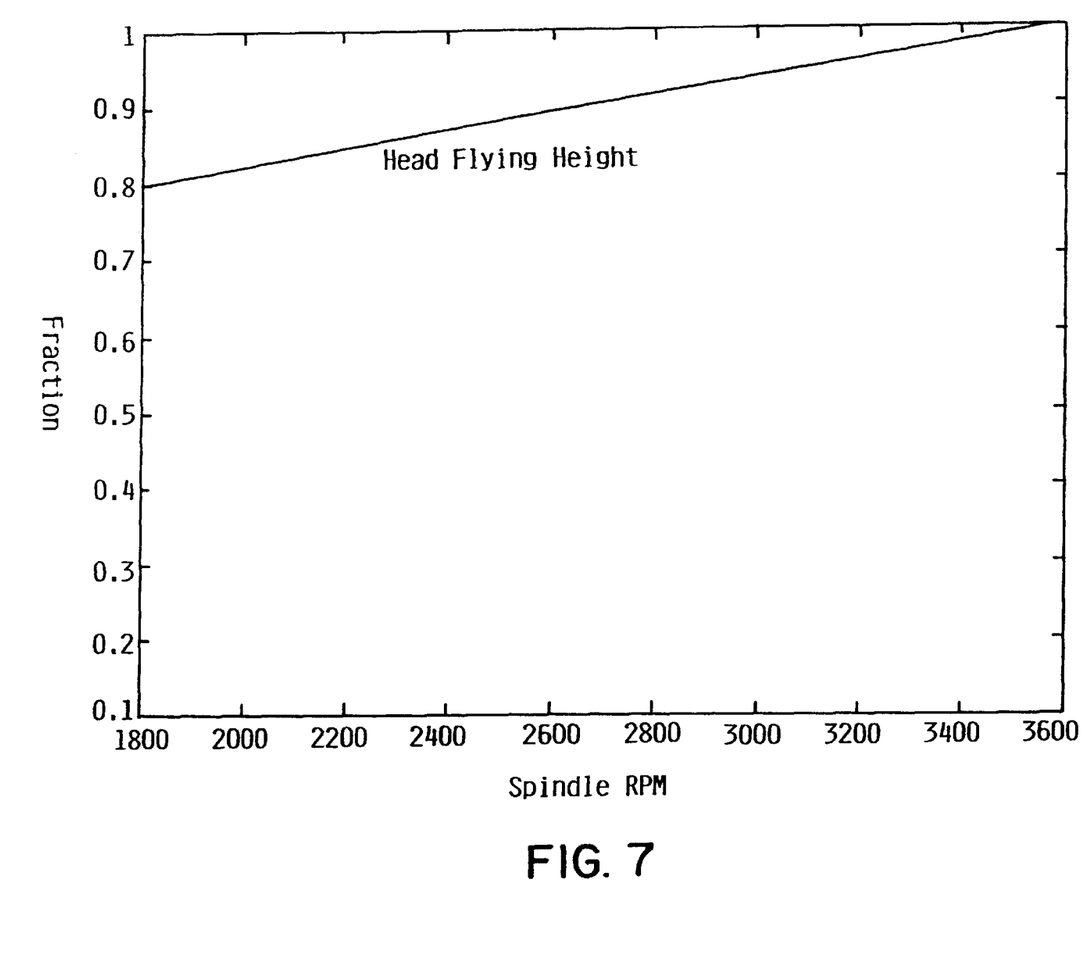
FIG. 7 illustrates a relationship between fractional head flying heights at different spindle motor velocities for tracks partitioned into zones according to a geometric progression.

Conversely, the flying height may be increased by increasing the spindle speeds if the flying height drops, for example, as a result of decreased atmospheric pressure. The fractional head flying heights for the arithmetic and geometric radii progressions are illustrated in FIGS. 6 and 7, respectively.

FIGS. 8A and 8B are tables depicting the zone radii (for the inner radii for each zone in millimeters) and frequency in Megahertz for the geometric and arithmetic radii progressions, respectively, as a function of varying spindle speed (RPM). The tables also list the fractional flying height (FH) for the different spindle speeds. In FIG. 8A, representing the geometric progression, the zone frequencies are identical along the diagonals of the table. The diagonal relationship of the frequencies illustrates the above-noted advantageous characteristics of the geometric progression in tabular form.

It is noted that while in FIG. 3 a digital system is shown, the advantages of the invention may also be obtained using analog or hybrid analog/digital components. For example, a tunable analog equalizer may be incorporated into the read channel of the disk drive in place of the adaptive digital equalizer 322. The tunable analog equalizer could be coupled to a resistor bank in place of ROM 323. The resistor bank may include a number of resistors that can be switched in parallel or series to make up different resistor values used as coefficients to be used by the analog equalizer. Such a system is useful when very high operating speeds are used in the disk drive. Current disk drives may operate at speeds close to 200 megahertz (MHz). At such rates, analog-to-digital conversion circuitry becomes expensive. In order to reduce cost, the read channel may be implemented using more analog components. For example, detection can be simplified by using analog circuitry thereby reducing costs. Further, power dissipation may be reduced using analog components. As the operating speed of the disk drive is further increased the need to use analog devices in the read channel becomes even more important.

One potential drawback to using analog components in a disk drive changing spindle speed to conserve power is that discrete components must be made available for each zone bit frequency used. As can be appreciated, using the above described geometric progression for partitioning zones provides for significant cost savings by reducing the number of different zone bit frequencies the drive must handle thereby reducing the number of discrete analog components needed.

While the invention has been described above in connection with various embodiments, it will be apparent from the above disclosure that the implementation may be used with various other systems and embodiments. Thus, the various embodiments described above are provided by way of illustration only and should not be construed to limit the invention. Those skilled in the art will readily recognize various modifications and changes which may be made to the present invention without strictly following the exemplary embodiments and applications illustrated and described herein, and without departing from the true spirit and scope of the present invention which is set forth in the following claims.

What is claimed is:

1. A memory storage device, comprising:
   a storage medium for storing data;
   a motor connected to the storage medium to selectively rotate the storage medium at a plurality of discrete operational velocities;
   a transducer mounted to read from and write to the storage medium at each of the plurality of discrete velocities; and
   a control unit coupled to receive an environment signal indicative of an environmental condition impacting operation of the memory storage device, the control unit providing a control signal to the motor indicative of a selected one of the plurality of discrete operational velocities based on the environment signal and coordinating transferring of data between the transducer and the storage medium at the selected discrete operational velocity.

2. A device as recited in claim 1, further comprising an accelerometer detecting an amount of shock or vibration in which the memory storage device is operating, wherein an output of the accelerometer is used to produce the environment signal and the control unit changes a rotational velocity of the storage medium to the selected one of the discrete operational velocities when the amount of shock or vibration reaches a predefined threshold.

3. A device as recited in claim 1, further comprising a temperature sensor detecting a temperature in which the memory storage device is operating, wherein an output of the temperature sensor is used to produce the environment signal and the control unit changes a rotational velocity of the storage medium to the selected one of the discrete operational velocities when the temperature reaches a predefined threshold.

4. A device as recited in claim 1, further comprising a pressure sensor detecting an atmospheric pressure in which the memory storage device is operating, wherein an output of the pressure sensor is used to produce the environment signal and the control unit changes a rotational velocity of the storage medium to the selected one of the discrete operational velocities when the atmospheric pressure reaches a predefined threshold.

5. A device as recited in claim 1, wherein the environment signal represents user input data indicative of the environment in which the memory storage device is operating.

6. A device as recited in claim 1, wherein the environment signal represents a spacing between the storage medium and the transducer.

7. A device as recited in claim 6, wherein the control unit selects a new discrete operational velocity when the spacing is below a predefined threshold, the new discrete operational velocity corresponding to a velocity at which the spacing between the storage medium and the transducer is increased.

8. A device as recited in claim 1, wherein the storage medium is banded into multiple zones each having a uniquely assigned zone bit frequency for reading data from the storage medium at a given discrete operational velocity, the zones being defined by radii determined according to a geometric progression which maintains a substantially constant ratio of radii between adjacent zones.

9. A method of controlling rotational velocity of a rotating storage medium in a storage device, the method comprising the steps of:

receiving an indication of an environmental condition in which the storage device is operating;

selecting, based on the environmental condition, an operational velocity of the rotating storage medium from a plurality of operational velocities and transferring data to or from the rotating storage medium rotating at the selected operational velocity.

10. A method as recited in claim 9, further comprising the steps of:

sensing atmospheric pressure in the storage device; and producing the indication of the environmental condition using the sensed atmospheric pressure.

11. A method as recited in claim 9, further comprising the steps of:

sensing movement of the storage device; and producing the indication of the environmental condition using the sensed movement.

12. A method as recited in claim 9, further comprising the steps of:

sensing temperature of the storage device; and producing the indication of the environmental condition using the sensed temperature.

13. A method as recited in claim 9, wherein the receiving step comprises the step of receiving input from a user indicative of an operating environment in which the storage device is operating.

14. A method as recited in claim 9, further comprising the step of:

dividing the storage medium into multiple zones of track locations, each zone having a uniquely assigned zone bit frequency for reading data from the storage medium at a given operational velocity, the zones being defined by radii determined according to a geometric progression which maintains a substantially constant ratio of radii between adjacent zones.

15. A storage device, comprising:

a rotating storage medium;

a data transfer transducer; and a control unit provided to control an operational velocity of the storage medium at which data is read from and written to the storage medium using the data transfer transducer, the control unit selecting an operational velocity based on an environmental condition impacting operation of the storage device.

16. A storage device as recited in claim 15, further comprising a sensor mounted in the storage device to sense the environmental condition and to provide an indication to the control unit of the sensed environmental condition.

17. A storage device as recited in claim 16, wherein the sensor comprises an accelerometer to detect an amount of shock or vibration imparted to the storage device, and wherein the control unit changes a rotational velocity of the storage medium to a new operational velocity when the amount of shock or vibration reaches a set threshold.

18. A storage device as recited in claim 16, wherein the sensor comprises a temperature sensor to detect a temperature at which the storage device is operating, and wherein the control unit changes a rotational velocity of the storage medium to a new operational velocity when the temperature reaches a set threshold.

19. A storage device as recited in claim 16, wherein the sensor comprises a pressure sensor to detect an atmospheric pressure at which the storage device is operating, and wherein the control unit changes a rotational velocity of the storage medium to a new operational velocity when the atmospheric pressure reaches a set threshold.

20. A storage device as recited in claim 15, further comprising:

a first sensor provided to sense a first environmental condition to provide a first indication to the control unit of the first environmental condition; and a second sensor provided to sense a second environmental condition to provide a second indication to the control unit of the second environmental condition, wherein the control unit selects an operational velocity based on the first and second environmental conditions.

21. A storage device as recited in claim 20, wherein the first sensor is an accelerometer to detect an amount of shock or vibration imparted to the storage device and the second sensor is a pressure sensor to detect an atmospheric pressure at which the storage device is operating.

22. A storage device as recited in claim 15, wherein the storage medium is banded into multiple zones each having a uniquely assigned zone bit frequency for reading data from the storage medium at a given discrete operational velocity, the zones being defined by radii determined according to a geometric progression which maintains a substantially constant ratio of radii between adjacent zones.

23. A computer incorporating the storage device of claim 15.

24. A computer as recited in claim 23, further comprising a user input device for inputting data indicative of the environmental condition.

* * * * *